(12) United States Patent
Unkle et al.

(10) Patent No.: US 6,795,935 B1
(45) Date of Patent: Sep. 21, 2004

(54) DIAGNOSIS OF FAULTS IN A COMPLEX SYSTEM

(75) Inventors: C. Richard Unkle, Fairview, PA (US); Richard G. Bliley, Erie, PA (US); William R. Schneider, Erie, PA (US); Stephen M. Pelkowski, Erie, PA (US)

(73) Assignee: General Electric Company, Schenectady, NY (US)

( * ) Notice: Subject to any disclaimer, the term of this patent is extended or adjusted under 35 U.S.C. 154(b) by 595 days.

(21) Appl. No.: 09/620,039

(22) Filed: Jul. 20, 2000

Related U.S. Application Data

(60) Provisional application No. 60/162,045, filed on Oct. 28, 1999.

(51) Int. Cl.[7] ............................................. G06F 11/00
(52) U.S. Cl. ............................ 714/37; 340/438; 701/19
(58) Field of Search .......................... 714/37; 340/438; 701/19; 700/79, 174, 177

(56) References Cited

U.S. PATENT DOCUMENTS

| | | |
|---|---|---|
| 4,258,421 A | 3/1981 | Juhasz et al. |
| 4,270,174 A | 5/1981 | Karlin et al. |
| 4,463,418 A | 7/1984 | O'Quin, II et al. |
| 4,517,468 A | 5/1985 | Kemper et al. |
| 4,695,946 A | 9/1987 | Andreasen et al. |
| 4,823,914 A | 4/1989 | McKinney et al. |
| 4,970,725 A | 11/1990 | McEnroe et al. |
| 4,977,390 A | 12/1990 | Saylor et al. |
| 5,113,489 A | 5/1992 | Cihiwsky et al. |
| 5,123,017 A | 6/1992 | Simpkins et al. |
| 5,274,572 A | 12/1993 | O'Neill et al. |
| 5,282,127 A | 1/1994 | Mii |
| 5,321,837 A | 6/1994 | Daniel et al. |
| 5,329,465 A | 7/1994 | Arcella et al. |
| 5,400,018 A | 3/1995 | Scholl et al. |
| 5,406,502 A | 4/1995 | Haramaty et al. |
| 5,442,553 A | 8/1995 | Parrillo |
| 5,445,347 A | 8/1995 | Ng |
| 5,463,768 A | 10/1995 | Cuddihy et al. |
| 5,508,941 A | 4/1996 | Leplingard et al. |
| 5,528,499 A | 6/1996 | Hagenbuch |
| 5,528,516 A | 6/1996 | Yemini et al. |
| 5,594,663 A | 1/1997 | Messaros et al. |
| 5,596,712 A * | 1/1997 | Tsuyama et al. ............... 714/26 |
| 5,631,832 A | 5/1997 | Hagenbuch |
| 5,633,628 A | 5/1997 | Denny et al. |
| 5,638,296 A | 6/1997 | Johnson et al. |
| 5,650,928 A | 7/1997 | Hagenbuch |
| 5,650,930 A | 7/1997 | Hagenbuch |
| 5,661,668 A | 8/1997 | Yemini et al. |
| 5,666,534 A | 9/1997 | Gilbert et al. |
| 5,678,002 A | 10/1997 | Fawcett et al. |
| 5,713,075 A | 1/1998 | Threadgill et al. |

(List continued on next page.)

OTHER PUBLICATIONS

NA9006399 IBM Technical Disclosure Bulletin; Jun. 1, 1990; vol. 33 Issue 1A; "Maintenance Procedures Using Maintenance Log Functions".*

NN80112493 IBM Technical Disclosure Bulletin; Nov. 1, 1980; vol. 23 Issue 6; "Error Log analysis".*

Johnson, Daniel; Data-Tronic Gas Turbine Information and Control System; 1981; Schenectady, New York; USA.

*Primary Examiner*—Scott Baderman
*Assistant Examiner*—Joshua Lohn
(74) *Attorney, Agent, or Firm*—Carl A. Rowold; John L. DeAngelis, Jr.; Beusse Brownlee Wolter Mora & Maire, P.A.

(57) ABSTRACT

A method and apparatus for chronologically combining fault data, repair data, and operational parameters for a railroad locomotive. Generally, this data is collected and stored in separate databases. The present invention teaches combining the data so that an ordered analysis reflecting the timing of faults, repairs, and operational information can be carried out to determine the root causes of the faults.

9 Claims, 7 Drawing Sheets

U.S. PATENT DOCUMENTS

| | | | |
|---|---|---|---|
| 5,742,915 A | | 4/1998 | Stafford |
| 5,809,161 A | | 9/1998 | Auty et al. |
| 5,842,125 A | | 11/1998 | Modzelesky et al. |
| 5,845,272 A | * | 12/1998 | Morjaria et al. ............... 706/50 |
| 5,884,073 A | | 3/1999 | Dent |
| 5,884,202 A | | 3/1999 | Arjomand |
| 5,926,745 A | | 7/1999 | Threadgill et al. |
| 5,949,345 A | | 9/1999 | Beckert et al. |
| 5,950,147 A | | 9/1999 | Sarangapani et al. |
| 5,988,645 A | | 11/1999 | Downing |
| 6,028,537 A | | 2/2000 | Suman et al. |
| 6,058,307 A | | 5/2000 | Garner |
| 6,094,609 A | | 7/2000 | Arjomand |
| 6,104,988 A | | 8/2000 | Klarer |
| 6,112,085 A | | 8/2000 | Garner et al. |
| 6,161,071 A | | 12/2000 | Shuman et al. |
| 6,169,943 B1 | | 1/2001 | Simon et al. |
| 6,343,236 B1 | * | 1/2002 | Gibson et al. ................. 700/79 |
| 6,415,395 B1 | * | 7/2002 | Varma et al. ................. 714/37 |
| 6,567,000 B2 | * | 5/2003 | Slifkin et al. ............... 340/436 |

\* cited by examiner

FIG. 2

| CUST | UNIT | DATE | CODE | DESC | DESCRIPTION | FAILMODE_DESC | SUB_ASSEMBLY_CODE | MAIN_ASSEMBLY_CODE |
|---|---|---|---|---|---|---|---|---|
| RR | 3500 | Sun Jul 13 1997 | 1111 | Piping Fittings-Engine Intercooler | REPAIRED WATER LEAK AT TOP OF RT | LEAKING FLUID AIR | ENGINTCOOL | ENGINE |
| RR | 3500 | Tue Jul 01 1997 | 2222 | Lube Oil - Engine | WATER IN LUBE OIL CHANGED OIL | CONTAMINATED | LUBEOIL | ENGISUPT |
| RR | 3500 | Sun Jun 28 1997 | 3333 | DRP - Battery Charger Regulator Panel | NO BATTCHARGE-REPL DRP | UNKNOWNUNDETERMI | POWERPANEL | POWERELN |
| RR | 3500 | Wed Jun 18 1997 | 4444 | EFI - High Pressure Pump | REPLACE 3HP PUMPS FOR NOT FIRING | UNKNOWNUNDETERMI | ENGFUELINJ | ENGINE |
| RR | 3500 | Mon Jun 09 1997 | 5555 | Turbocharger Assembly - General - Eng | TURBO DRAGSSECONDARY DAMAGE-RPL | UNKNOWNUNDETERMI | ENGTURBO | ENGINE |
| RR | 3500 | Sat May 24 1997 | 6666 | Cylinder Assembly - General - Eng | REPL N6 PA FOR SECONDARY DAMAGE | UNKNOWNUNDETERMI | POWERASSY | ENGINE |
| RR | 3500 | Sat May 24 1997 | 7777 | Cylinder Assembly - General - Eng | TRIPPING COP PISTON FAILURE CO | UNKNOWNUNDETERMI | POWERASSY | ENGINE |

FIG. 3

```
RR 3500 03-MAY-1997 1000 90623.06 90637.20  0.0 C S 0 1 2 0 101  97 R E 0 0                                      Intake Manifold Air Too
RR 3500 03-MAY-1997 2000 90623.06 90637.20  0.0 C S 0 1 2 0 101  97 R E 0 0                                      Intake Manifold Air Too
RR 3500 22-MAY-1997 3000 91067.93 91067.93 11.4 F 5 992 288 4706 202 177 182 M E F 0  6 AB_M_S                   COP Trip
RR 3500 22-MAY-1997 4000 91067.93 91067.93 11.4 F 5 992 288 4706 202 177 182 M E F 0  6 AB_M_S                   COP Trip
RR 3500 22-MAY-1997 5000 91068.70 91068.71 16.5 F 4 885 338 2864 133 175 186 M E 2 4  6 AB_M_S                   COP Trip
RR 3500 22-MAY-1997 6000 91068.70 91068.71 16.5 F 4 885 338 2864 133 175 186 M E 2 4  6 AB_M_S                   COP Trip
RR 3500 22-MAY-1997 7000 91068.71   000    17.9 F 1 458   6   0 174 186 R E F 4  E AB                            Fault Reset While In I.e
RR 3500 22-MAY-1997 8000 91068.71   000    17.9 F 1 458   6   0 174 186 R E F 4  E AB                            Fault Reset While In I.e
RR 3500 22-MAY-1997 9000 91069.55 91069.55 23.1 F 5 992 474 3005 148 180 187 M E 2 0 R 6 AB_M_S                  COP Trip
RR 3500 22-MAY-1997 1111 91069.55 91069.55 23.1 F 5 992 474 3005 148 180 187 M E 2 0 R 6 AB_M_S                  COP Trip
RR 3500 22-MAY-1997 2222 91069.56 91069.58 27.4 F 6 1010 506 2405 128 179 189 M E F 4  6 AB_M_S                  COP Trip
```

| UNIT_NUMBER | OCCUR_DATE | FAULT | FAULT_LABEL | FAULT_DESC | OCCURRENCE | RESET_TIME | LOCO_SPEED | DIRECTION | NOTCH | ENG_SPEED | VOLTS | CURRENT_AMPS | FAULT_SUB_ID |
|---|---|---|---|---|---|---|---|---|---|---|---|---|---|
| 6572 | 2/15/99 14:00 | 731A | EVENT_INV3_BP | PM3B+ OR IMC2-3,4,7/TMC-3,0 | 106286.01 | 106286.01 | 28.799999 | F | 6 | 992 | 1129 | 1702 | 4 |
| 6572 | 2/17/99 16:21 | 731A | EVENT_INV3_BP | PM3B+ OR IMC2-3,4,7/TMC-3,0 | 106336.25 | 106336.35 | 17 | F | 5 | 992 | 939 | 1648 | 4 |
| 6572 | 2/17/99 16:48 | 731A | EVENT_INV3_BP | PM3B+ OR IMC2-3,4,7/TMC-3,0 | 106336.81 | 106336.81 | 9.8000002 | R | 1 | 436 | 395 | 0 | 4 |
| 6572 | 2/17/99 20:21 | 740F | EVENT_INV5_SYS | SYS FLT-IMC3-3,4 PSC-3, SS5 BAD | 106340.36 | 106340.45 | 5 | F | 1 | 439 | 31 | 3 | 12 |
| 6572 | 2/18/99 23:54 | 731A | EVENT_INV3_BP | PM3B+ OR IMC2-3,4,7/TMC-3,0 | 106367.9 | 106367.9 | 0 | F | 1 | 577 | 5 | 0 | 4 |
| 6572 | 2/18/99 | 810 | EVENT_ | | LOADING PROBLEMS IN POWER | | | | | | ROAD FAILURE | | |
| 6572 | 2/18/99 | 810 | EVENT_9900 | REPT AUTOMOTORS ARE CUTOUT-NO MORE INFO GIVEN.CLV/OMA | | | | | 140 | | | | |
| 6572 | 2/18/99 | 810 | EVENT_ | NFT NOT CUTOUT INTO SMORR | | | | | | | | | |
| 6572 | 2/19/99 16:39 | 731A | EVENT_INV3_BP | PM3B+ OR IMC2-3,4,7/TMC-3,0 | 106384.66 | 106384.66 | 48.099998 | F | 1 | 436 | 493 | 32 | 4 |
| 6572 | 2/22/99 2:45 | 7323 | EVENT_INV3_CP | PM3C+ OR IMC2-3,4,7/TMC-3,0 | 106442.76 | 106442.76 | 2.5999999 | F | 1 | 442 | 400 | 55 | 4 |
| 6572 | 2/22/99 2:45 | 7323 | EVENT_INV3_CP | PM3C+ OR IMC2-3,4,7/TMC-3,0 | 106442.76 | 106442.76 | 2.7 | F | 1 | 439 | 400 | 44 | 1 |
| 6572 | 2/22/99 2:45 | 7323 | EVENT_INV3_CP | PM3C+ OR IMC2-3,4,7/TMC-3,0 | 106442.76 | 106442.76 | 3.0999999 | F | 1 | 439 | 402 | 61 | 1 |
| 6572 | 2/22/99 3:55 | 7293 | EVENT_INV2_AN | PM2A-OR IMC1-3,4,7/TMC-3,0 | 106443.93 | 106443.93 | 23.6 | F | 1 | 439 | 415 | 55 | 2 |
| 6572 | 2/22/99 4:00 | 7293 | EVENT_INV2_AN | PM2A-OR IMC1-3,4,7/TMC-3,0 | 106444 | 106444 | 7.0999999 | F | 1 | 436 | 92 | 264 | 4 |
| 6572 | 2/22/99 4:00 | 7293 | EVENT_INV2_AN | PM2A-OR IMC1-3,4,7/TMC-3,0 | 106444 | 106444 | 7.0999999 | F | 1 | 439 | 400 | 326 | 4 |
| 6572 | 2/22/99 4:00 | 7293 | EVENT_INV2_AN | PM2A-OR IMC1-3,4,7/TMC-3,0 | 106444 | 106444 | 7 | F | 1 | 439 | 399 | 313 | 1 |
| 6572 | 2/22/99 8:57 | 7280 | EVENT_INV2_CPU | INV2 CPU CARD BAD IMC1-5 | 106448.95 | 106448.95 | 32.799999 | R | 1 | 436 | 400 | 55 | 48 |
| 6572 | 2/22/99 9:51 | 7323 | EVENT_INV2_CP | PM3C+ OR IMC1-5,6 PSC-3, SS2 BAD | 106449.86 | 106449.86 | 0 | R | 1 | 510 | 94 | 0 | 2 |
| 6572 | 2/22/99 9:51 | 728F | EVENT_INV2_SYS | SYS FLT-IMC1-5,6 PSC-3, SS2 BAD | 106449.86 | 106449.86 | 0 | C | 1 | 332 | 2 | 0 | 2 |
| 6572 | 2/22/99 9:51 | 7293 | EVENT_INV2_AN | PM2A-OR IMC1-3,4,7/TMC-2,0 | 106449.86 | 106449.86 | 0 | C | 1 | 332 | 2 | 57 | 12 |
| 6572 | 2/22/99 9:52 | 7287 | EVENT_INV2_GPS | GPS2, PSC-8, IMC1-7,5 BAD | 106449.88 | 106449.88 | 0 | C | 1 | 332 | 98 | 0 | 2 |
| 6572 | 2/22/99 9:52 | 7294 | EVENT_INV2_ANNF | PM2A-OR IMC1-5,6,7 BAD | 106449.88 | 106449.88 | 0 | C | 1 | 436 | 3 | 0 | 3 |
| 6572 | 2/22/99 9:52 | 729B | EVENT_INV2_BPNF | PM2B+ OR IMC1-5,6,7 BAD | 106449.88 | 106449.88 | 0 | C | 1 | 436 | 3 | 0 | 6 |
| 6572 | 2/22/99 9:52 | 729B | EVENT_INV2_BPNF | PM2B+ OR IMC1-5,6,7 BAD | 106449.88 | 106449.88 | 0 | C | 1 | 436 | 3 | 0 | 6 |
| 6572 | 2/22/99 9:52 | 7307 | EVENT_INV3_GPS | GPS3, PSC-8, IMC2-7,3 BAD | 106449.9 | 106449.9 | 0 | C | 1 | 439 | 3 | 0 | 3 |

FIG. 5A

| UNIT_NUMBER 100 | OCCUR_DATE 102 | 104 | FAULT_LABEL 106 | FAULT_DESC 108 | OCCURENCE 110 | RESET_TIME 112 | LOCO_SPEED 114 | DIRECTION 116 | NOTCH 118 | ENG_SPEED 120 | VOLTS 122 | CURRENT_AMPS 124 | FAULTSUB_ID 126 |
|---|---|---|---|---|---|---|---|---|---|---|---|---|---|
| 6572 | 2/22/99 9:52 | 731D | EVENT_INV3_BNNF | PM3B-OR IMC2-3,4,7 BAD | 106449.88 | 106449.9 | 0 | C | 1 | 436 | 3 | 0 | 6 |
| 6572 | 2/22/99 9:54 | 7324 | EVENT_INV3_CPNF | PM3C+OR IMC2-3,4,7 BAD | 106449.9 | 106449.9 | 0 | C | 1 | 436 | 3 | 0 | 6 |
| 6572 | 2/22/99 9:54 | 7324 | EVENT_INV3_CPNF | PM3C+OR IMC2-3,4,7 BAD | 106449.9 | 106449.9 | 0 | C | 1 | 439 | 3 | 0 | 3 |
| 6572 | 2/22/99 9:54 | 7307 | EVENT_INV3_GPS | GPS3, PSC-8, IMC2-7,3 BAD | 106449.9 | 106449.91 | 0 | C | 1 | 436 | 3 | 0 | 6 |
| 6572 | 2/22/99 9:54 | 731D | EVENT_INV3_BNNF | PM3B-OR IMC2-3,4,7 BAD | 106449.93 | 106449.91 | 0 | C | 1 | 436 | 3 | 0 | 6 |
| 6572 | 2/22/99 9:55 | 7323 | EVENT_INV3_CP | PM3C+OR IMC2-3,4,7/TMC-3,0 | 106449.95 | 106449.95 | 0 | R | 1 | 323 | 2 | 0 | 2 |
| 6572 | 2/22/99 9:57 | 7307 | EVENT_INV3_GPS | GPS3, PSC-8, IMC2-7,3 BAD | 106449.96 | 106449.96 | 0 | C | 1 | 439 | 3 | 0 | 3 |
| 6572 | 2/22/99 9:57 | 731D | EVENT_INV3_BNNR | PM3B-OR IMC2-3,4,7 BAD | 106449.96 | 106450.1 | 0 | C | 1 | 436 | 3 | 0 | 6 |
| 6572 | 2/22/99 9:57 | 7324 | EVENT_INV3_CPNR | PM3C+OR IMC2-3,4,7 BAD | 106449.96 | 106450.1 | 0 | C | 1 | 436 | 3 | 0 | 6 |
| 6572 | 2/22/99 10:06 | 7307 | EVENT_INV3_GPS | GPS3, PSC-8, IMC2-7,3 BAD | 106450.1 | 106450.1 | 0 | C | 1 | 577 | 5 | 0 | 3 |
| 6572 | 2/22/99 10:06 | 7324 | EVENT_INV3_CPNR | PM3C+OR IMC2-3,4,7 BAD | 106450.1 | 106450.1 | 0 | C | 1 | 580 | 5 | 0 | 6 |
| 6572 | 2/22/99 15:54 | 731A | EVENT_INV3_BP | PM3B+OR IMC2-3,4,7/TMC-3,0 | 106455.91 | 106455.91 | 28.700001 | F | 6 | 992 | 3 | 1130 1718 | 4 |

| UNIT_NUMBER | OCCUR_DATE | OCCUR_TIME | FAULT | FAULT_LABEL | FAULT_DESC | OCCUR_HOURS | RESET_HOURS | LOCO_SPEED | DIRECTION |
|---|---|---|---|---|---|---|---|---|---|
| 6572 | 2/22/99 | 09:54 | 7324 | EVENT_INV3_CPNR | PM3C+ OR IMC2-3,4,7 BAD | 106449.9 | 106449.9 | 0 | C |
| 6572 | 2/22/99 | 09:54 | 7307 | EVENT_INV3_GPS | GPS3, PSC-8,IMC2-7,3 BAD | 106449.9 | 106449.91 | 0 | C |
| 6572 | 2/22/99 | 09:54 | 731D | EVENT_INV3_BNNR | PM3B-OR IMC2-3,4,7 BAD | 106449.9 | 106449.91 | 0 | C |
| 6572 | 2/22/99 | 09:55 | 7323 | EVENT_INV3_CP | PM3C+ OR IMC2-3,4,7/TMC-3,0 | 106449.93 | 106449.95 | 0 | R |
| 6572 | 2/22/99 | 09:57 | 7307 | EVENT_INV3_GPS | GPS3, PSC-8,IMC2-7,3 BAD | 106449.96 | 106449.96 | 0 | C |
| 6572 | 2/22/99 | 09:57 | 731D | EVENT_INV3_BNNR | PM3B-OR IMC2-3,4,7 BAD | 106449.96 | 106450.1 | 0 | C |
| 6572 | 2/22/99 | 09:57 | 7324 | EVENT_INV3_CPNR | PM3C+ OR IMC2-3,4,7 BAD | 106449.96 | 106450.1 | 0 | C |
| 6572 | 2/22/99 | 10:06 | 7307 | EVENT_INV3_GPS | GPS3, PSC-8,IMC2-7,3 BAD | 106450.1 | 106450.1 | 0 | C |
| 6572 | 2/22/99 | 10:06 | 7324 | EVENT_INV3_CPNR | PM3C+ OR IMC2-3,4,7 BAD | 106450.1 | 106450.1 | 0 | C |
| 6572 | 2/22/99 | 15:54 | 731A | EVENT_INV3_BP | PM3B+ OR IMC2-3,4,7/TMC-3,0 | 106455.91 | 106455.91 | 28.7 | F |
| 6572 | 2/22/99 | 15:55 | 731A | EVENT_INV3_BP | PM3B+ OR IMC2-3,4,7/TMC-3,0 | 106455.93 | 106518.08 | 28.3 | F |
| 6572 | 2/26/99 | 00:30 | 731A | EVENT_INV3_BP | PM3B+ OR IMC2-3,4,7/TMC-3,0 | 106536.51 | 106536.51 | 15.2 | F |
| 6572 | 2/26/99 | 02:06 | 731A | EVENT_INV3_BP | PM3B+ OR IMC2-3,4,7/TMC-3,0 | 106538.1 | 106538.1 | 41.1 | F |
| 6572 | 2/27/99 | 12:12 | 731A | EVENT_INV3_BP | PM3B+ OR IMC2-3,4,7/TMC-3,0 | 106572.2 | 106572.2 | 30.3 | F |
| 6572 | 2/27/99 | 15:30 | 720F | EVENT_INV1_SYS | SYS FLT-IMC1-3,4 PSC-3, SS1 BAD | 106575.51 | 106575.6 | 0 | F |
| 6572 | 2/27/99 | 15:30 | 728F | EVENT_INV2_SYS | SYS FLT-IMC1-5,6 PSC-3, SS2 BAD | 106575.51 | 106575.6 | 0 | F |
| 6572 | 2/27/99 | 15:30 | 730F | EVENT_INV3_SYS | SYS FLT-IMC2-3,4 PSC-3, SS3 BAD | 106575.51 | 106575.6 | 0 | F |
| 6572 | 2/27/99 | 15:30 | 738F | EVENT_INV4_SYS | SYS FLT-IMC2-5,6 PSC-3, SS4 BAD | 106575.51 | 106575.6 | 0 | F |
| 6572 | 2/27/99 | 15:30 | 740F | EVENT_INV5_SYS | SYS FLT-IMC3-3,4 PSC-3, SS5 BAD | 106575.51 | 106575.6 | 0 | F |
| 6572 | 2/27/99 | 15:30 | 748F | EVENT_INV6_SYS | SYS FLT-IMC3-5,6 PSC-3, SS6 BAD | 106575.51 | 106575.6 | 0 | F |
| 6572 | 2/27/99 | 15:30 | 70E8 | INV_ALL_CUTOUT | ALL INVERTERS DISABLED | 106575.51 | 106575.6 | 0 | F |
| 6572 | 2/27/99 | MORRILL NEBRAS | | GD_XYZ-Gate Driver, X=Inv#,Y=Phs#,Z=Pol | | c/o pm 3c+ | gd | P-6572-0027 | 03 |
| 6572 | 2/28/99 | 11:09 | 731A | EVENT_INV3_BP | PM3B+ OR IMC2-3,4,7/TMC-3,0 | 106595.15 | 106595.15 | 10.9 | R |
| 6572 | 3/1/99 | 10:36 | 731A | EVENT_INV3_BP | PM3B+ OR IMC2-3,4,7/TMC-3,0 | 106618.61 | 106618.61 | 13 | R |
| 6572 | 3/1/99 | 11:00 | 731A | EVENT_INV3_BP | PM3B+ OR IMC2-3,4,7/TMC-3,0 | 106619 | 106762.66 | 30.5 | R |

| UNIT_NUMBER 100 | OCCUR_DATE 102 | OCCUR_TIME 102 | FAULT 104 | FAULT_LABEL 106 | FAULT_DESC 108 | OCCUR_HOURS 110 | RESET_HOURS 112 | LOCO_SPEED 114 | DIRECTION 116 |
|---|---|---|---|---|---|---|---|---|---|
| 6572 | 3/2/99 | 04:40 | 738F | EVENT_INV4_SYS | SYS FLT-IMC2-5,6 PSC-3, SS4 BAD | 106636.68 | 106636.76 | 0 | R |
| 6572 | 3/3/99 | 14:09 | 7293 | EVENT_INV2_AN | PM2A-OR IMC1-3,4,7/TMC-2,0 | 106670.15 | 106670.15 | 2.1 | R |
| 6572 | 3/3/99 | 14:09 | 7293 | EVENT_INV2_AN | PM2A-OR IMC1-3,4,7/TMC-2,0 | 106670.15 | 106670.15 | 2.2 | R |
| 6572 | 3/3/99 | 14:09 | 7293 | EVENT_INV2_AN | PM2A-OR IMC1-3,4,7/TMC-2,0 | 106670.15 | 106762.66 | 2.8 | R |
| 6572 | 3/3/99 | 15:18 | 7293 | EVENT_INV2_AN | PM2A-OR IMC1-3,4,7/TMC-2,0 | 106671.31 | 106762.66 | 0 | F |
| 6572 | 3/3/99 | 16:03 | 720F | EVENT_INV1_SYS | SYS FLT-IMC1-3,4 PSC-3, SS1 BAD | 106696.05 | 106696.13 | 0 | F |
| 6572 | 3/4/99 | 00:43 | 740F | EVENT_INV5_SYS | SYS FLT-IMC3-3,4 PSC-3, SS5 BAD | 106704.73 | 106704.81 | 0 | R |
| 6572 | 3/5/99 | 04:03 | 740F | EVENT_INV5_SYS | SYS FLT-IMC1-3,4 PSC-3, SS5 BAD | 106708.05 | 106708.13 | 0 | R |
| 6572 | 3/5/99 | 04:03 | 748F | EVENT_INV6_SYS | SYS FLT-IMC3-5,6 PSC-3, SS6 BAD | 106708.05 | 106708.13 | 0 | R |
| 6572 | 3/5/99 | 18:12 | 720F | EVENT_INV1_SYS | SYS FLT-IMC1-3,4 PSC-3, SS1 BAD | 106722.21 | 106722.3 | 0 | R |
| 6572 | 3/6/99 | 03:28 | 748F | EVENT_INV6_SYS | SYS FLT-IMC3-5,6 PSC-3, SS6 BAD | 106731.48 | 106731.56 | 0 | R |

FIG. 6B

DIAGNOSIS OF FAULTS IN A COMPLEX SYSTEM

This patent application claims the benefit of U.S. Provisional Application No. 60/162,045 filed on Oct. 28, 1999.

BACKGROUND OF THE INVENTION

The present invention relates generally to machine diagnostics, and more specifically to a system and method that improves diagnostic accuracy by presenting fault and operational data in a chronologically ordered file.

A machine, such as a locomotive or other complex system used in industrial processes, medical imaging, telecommunications, aerospace applications, and power generation may include controls and sensors for monitoring the various systems and subsystems of the machine recording certain operational parameters and generating a fault indication when an anomalous operating condition occurs. Certain of these anomalous conditions may require the imposition of operational restrictions on the machine, without requiring a complete and total shutdown. In any case, because restricted operation can be costly, it is essential to accurately diagnose and quickly repair the machine.

Such complex machines may generate an error log (or fault log), containing information related to a malfunction. The field engineer called to diagnose and repair the machine will first consult the error log to assist with the diagnosis process. The error log presents a "signature" of the machine's operation and can be used by the repair technician to identify specific malfunctions and the operational parameters of the machine before, during and after the fault occurred. Using her accumulated experiences at solving machine malfunctions, the field engineer reviews the error log, identifies the root cause of the fault and then repairs the machine to correct the problem. If the diagnosis was accurate, the repair will correct the machine malfunction. When the error log contains only a small amount of information and the machine is relatively simple, this manual process will work fairly well. However, if the error log is voluminous and the machine is complex, some entries may have an uncertain relationship or perhaps no relationship to the malfunction. It will therefore be difficult for the field engineer to properly review and analyze all the information and successfully diagnose the fault.

To overcome the problems associated with evaluating large amounts of data in error logs, computer-based diagnostic expert systems have been developed and put to use. These diagnostic expert systems are developed by interviewing field engineers to determine how they proceed to diagnose and fix a machine malfunction. The interview results are then translated into rules and procedures that are stored in a repository, which forms a either a rule base or a knowledge base for machine repairs. The rule or knowledge base operates in conjunction with a rule interpreter or a knowledge processor to form the diagnostic expert system. Based on information input by the technician, the rule interpreter or knowledge processor can quickly parse information in the rule or knowledge base to evaluate the operation of the malfunctioning machine and provide guidance to the field engineer. One disadvantage associated with such conventional diagnostic expert systems is the limited scope of the rules or knowledge stored in the repository. The process of knowledge extraction from experts is time consuming, error prone and expensive. Finally, the rules are brittle and cannot be updated easily. To update the diagnostic expert system, the field engineers have to be frequently interviewed so that the rules and knowledge base can be reformulated.

Another class of diagnostic systems use artificial neural networks to correlate operational and fault data with potential root causes. An artificial neural network typically includes a number of input nodes, a layer of output nodes, and one or more "hidden" layer of nodes between the input and output nodes. Each node in each layer is connected to one or more nodes in the preceding and the following layer. The connections are via adjustable-weight links analogous to variable coupling-strength neurons. Before being placed in operation, the artificial neural network must be trained by iteratively adjusting the connection weights, using pairs of known input and output data, until the errors between the actual and known outputs, based on a consistent set of inputs, are acceptably small. A problem with using an artificial neural network for diagnosing machine malfunctions, is that the neural network does not produce explicit fault correlations that can be verified by experts and adjusted if desired. In addition, the conventional steps of training an artificial neural network do not provide a measure of its effectiveness so that more data can be added if necessary. Also, the effectiveness of the neural network is limited and does not work well for a large number of variables.

Case-based reasoning diagnostic expert systems can also be used to diagnose faults associated with malfunctioning machines. Case-based diagnostic systems use a collection of data, known as historical cases, and compare it to a new set of data, a new case, to diagnose faults. In this context, a case refers to a problem/solution pair that represents the diagnosis of a problem and the identification of an appropriate repair (i.e., solution). Case-based reasoning (CBR) is based on the observation that experiential knowledge (i.e., memory of past experiences) can be applied to solving current problems or determining the cause of current faults. The case-based reasoning process relies relatively little on pre-processing of raw input information or knowledge, but focuses instead on indexing, retrieving, reusing, comparing and archiving cases. Case-based reasoning approaches assume that each case is described by a fixed, known number of descriptive attributes and use a corpus of valid historical cases against which new incoming cases can be matched for the determination of the root cause of the fault and the generation of a repair recommendation.

Commonly assigned U.S. Pat. No. 5,463,768 discloses an approach to fault identification using fault or error log data from one or more malfunctioning machines using a CBR approach. Each of the historical error logs contains data representative of fault events occurring within the malfunctioning machines. In particular, a plurality of historical error logs are grouped into case sets of common malfunctions. Common patterns, i.e., identical consecutive rows or strings of error data in the case sets are used for comparison with new error log data. In this comparison process, sections of data in the new error log that are common to sections of data in each of the historical case sets (the historical error logs) are identified. Since the historical error logs have been correlated with a specific repair having a high probability of resolving the fault, the common sections of data in the historical error logs and the new error log can lead to a recommended repair with a high probability of resolving the fault.

U.S. Pat. No. 6,415,395, entitled "Method and System for Processing Repair Data and Fault Log Data to Facilitate Diagnostics", assigned to the assignee of the present invention and herein incorporated by reference, discloses a system and method for processing historical repair data and historical fault log data, where this data is not restricted to sequential occurrences of fault log entries, as in the commonly owned patent described above. This system includes means for generating a plurality of cases from the repair data and the fault log data. Each case comprises a repair and a plurality of related, but distinct faults. For each case, at least one repair and distinct fault cluster combination is generated and then a weight is assigned thereto. This weight value indicates the likelihood that the repair will resolve any of the faults included within that fault cluster. The weight is calculated by dividing the number of times the fault cluster combination occurs in cases comprising related repairs by the number of times the combination occurs in all cases. New fault log data is entered into the system and compared with the plurality of fault log clusters. The repair associated with the matching fault log cluster represents a candidate repair to resolve the new fault. The report output from this system lists the candidate repairs in sequential order according to the calculated weights.

Further, U.S. Pat. No. 6,343.236, entitled "Method and System for Analyzing Fault Log Data for Diagnostics", assigned to the same assignee of the present invention and herein incorporated by reference, discloses a system and method for analyzing new fault log data from a malfunctioning machine, again where the system and method are not restricted to sequential occurrences of fault log entries. The fault log data is clustered based on related faults and then compared with historical fault clusters. Each historic fault cluster has associated with it a repair wherein the correlation between the fault cluster and the repair is indicated by a repair weight. Upon locating a match between the current fault cluster and one or more of the historical fault clusters, a repair action is identified for the current fault cluster based on the repair associated with the matching historical fault cluster.

One particular type of fault that can be advantageously analyzed by certain fault analysis and diagnostic tools is the so-called "no trouble found" fault. Failure conditions that are difficult to diagnose within a complex system may result in such a declaration of no trouble found. Typically, the system experiences intermittent failures and when the system is taken out of service for diagnosis, there is no evidence of a fault or failure, i.e., the fault is intermittent. In this situation, the repair technician declares that the system is failure free and ready for return to service, i.e., no trouble found. Later, the system may experience a repeat failure due to the same problem.

It is believed that the fault and repair analysis tools disclosed in the patent applications described above provide certain advantages and advancements in the art of the diagnostics of complex machines. It would be desirable, however, to provide a system and method to improve the evaluation and identification of faults by undertaking the analysis on a chronologically ordered set of fault data and machine operational information.

BRIEF SUMMARY OF THE INVENTION

The search for an effective tool to diagnose failures occurring in a complex system, such as a railroad locomotive, has been an elusive one. Several such tools are discussed above. The present invention describes a process that systematically combines fault log and machine operational information (sensor readings of various operational parameters commonly referred to as data packs) with maintenance and repair data and fault declaration information into a single chronologically ordered file. With the data ordered chronologically, the present invention offers a more effective tool to diagnose the exact nature and cause of a fault. Combining all of this information, as taught by the present invention, presents the repair analyst with a single file from which the state of the machine can be determined at any time prior to and after the occurrence or recording of a specific fault. By identifying anomalies and analyzing operational parameters occurring immediately prior to the fault (and in some cases, after the fault), the analyst can identify the most probable cause. Additionally, by reviewing the data pack information recorded immediately after a repair or other maintenance action, the analyst can determine the effectiveness of that repair or maintenance activity. The chronologically ordered data presentation also allows the detection of incipient faults based on anomalous conditions and operational parameters. Analysis rules can then be established for later use in recognizing potential fault conditions in the operational data. The present invention can also help to create data filters so that only the information identified as pertinent to a particular fault is analyzed. The filtered out data can be ignored due to its apparent lack of correlation with a specific fault. Using the teachings of the present invention increases the accuracy of failure diagnosis, resulting in more effective (e.g., more timely and less costly) troubleshooting and repair actions. Fewer repeat failures will occur because there will be fewer misdiagnosed cases and fewer no trouble found faults.

BRIEF DESCRIPTION OF THE DRAWINGS

The features and advantages of the present invention will become apparent from the following detailed description of the invention when read together with the accompanying drawings in which:

FIG. 2 is an illustration of exemplary repair log data;

FIG. 3 is an illustration of exemplary fault log data;

FIGS. 5 and 6 illustrate exemplary data ordered in accordance with the teachings of the present invention.

DETAILED DESCRIPTION OF THE PREFERRED EMBODIMENTS

Figure 1:
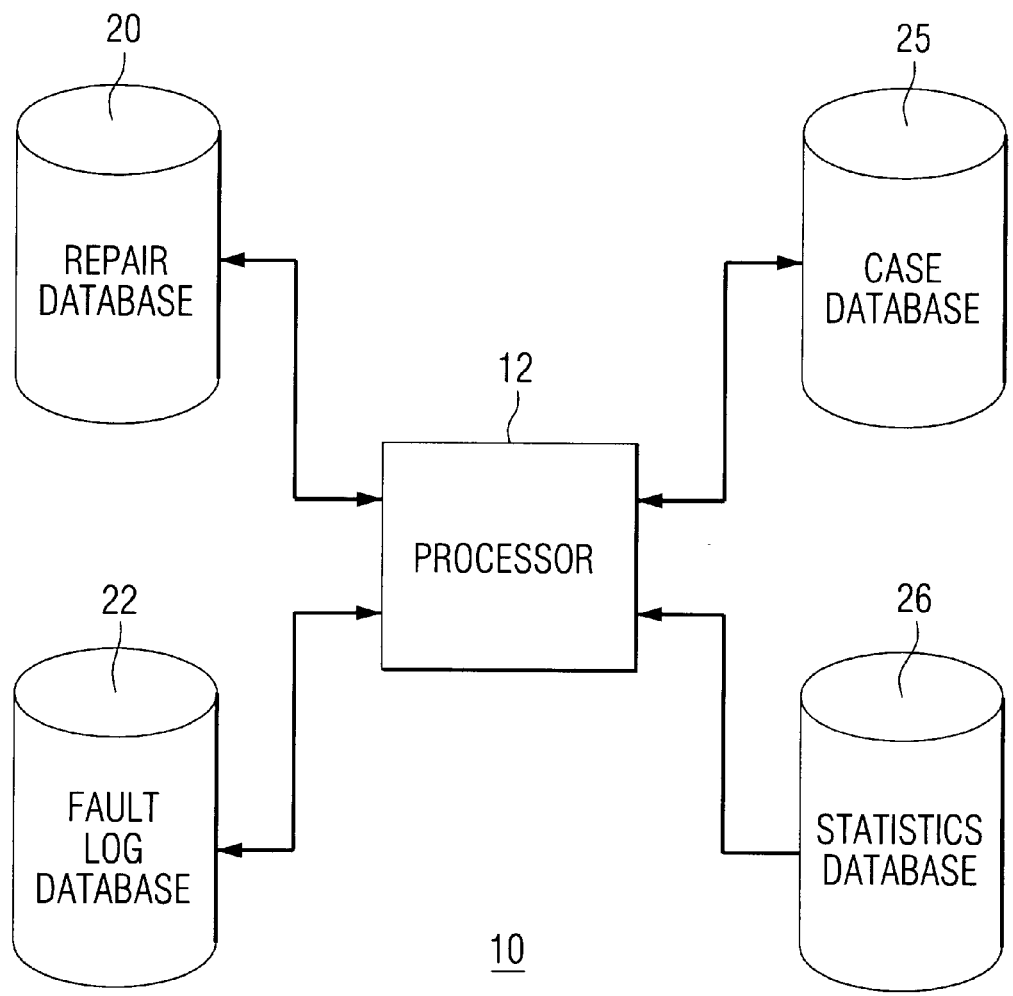
FIG. 1 is a block diagram of one embodiment of a system of the present invention using a processor for processing operation parametric data and fault log data.

Before describing in detail the particular fault diagnosis system in accordance with the present invention, it should be observed that the present invention resides primarily in a novel combination of processing steps and hardware elements related to a system for diagnosing faults on a machine. Accordingly, these processing steps and hardware components have been represented by conventional processes and elements in the drawings, showing only those specific details that are pertinent to the present invention, so as not to obscure the disclosure with structural details that will be readily apparent to those skilled in the art having the benefit of the description herein.

FIG. 1 diagrammatically illustrates one embodiment of the diagnostic system 10 of the present invention for analyzing faults for the purpose of identifying root causes, fault patterns, and correlations of these patterns with operational data. The diagnostic system 10 provides a process for automatically harvesting or mining repair data describing related and unrelated repairs, fault log data describing faults or anomalous events, and parametric operational data from one or more machines, such as locomotives. The diagnostic system 10 generates a chronological list of the repair information, fault data, and operational parametric information for analysis by a locomotive repair expert. With the disparate databases combined in a chronologically ordered database, the process of analysis is easier as the potential correlation between various data items is easier to identify.

Although the present invention is described with reference to a locomotive, the diagnostic system 10 can be used in conjunction with any machine where the operational parameters of the machine are monitored. Exemplary applications include complex machinery used in the medical diagnostic field, telecommunications field, and aircraft engine field.

The exemplary diagnostic system 10 illustrated in FIG. 1 includes a processor 12 such as a computer (e.g., a UNIX workstation) having a hard drive, input devices such as a keyboard or a mouse, magnetic storage media (e.g., tape cartridges or disks), optical storage media (e.g., CD-ROM's), and output devices such as a display and a printer. The processor 12 is connected to and processes data contained in a repair database 20 and a fault log database 22.

The repair database 20 includes repair data or records describing repairs or maintenance actions for one or more locomotives. FIG. 2 shows an exemplary portion 30 of the repair data contained in the repair data database 20. The repair data includes a customer identifier in a column 32, a unique locomotive identifier or locomotive road number in a column 33, the repair date in a column 34, a repair code in a column 35, a prose description of the repair in a column 36, a description of the actual repair performed in a column 37, a description of the failure mode that the repair was intended to resolve (if any) in a column 38, the sub-assembly on which the repair was conducted in a column 39, and the primary system to which the repair relates in acolumn 40. The information in the repair database 20 is collected from field support personnel located at the locomotive maintenance facilities. Locomotives are brought into the repair facility as required to undergo repair, and also on a predetermined fixed schedule for regular preventative maintenance and minor repairs. Entries in the repair database are made at that time.

The fault log database 22 includes fault log data indicating faults on the locomotive, as recorded by an on-board monitor system at the locomotive. Further details of an exemplary on-board monitor system can be found in commonly-owned United States patent application bearing the title "On-Board Monitor for a Railroad Locomotive", filed on Oct. 25, 2000 with application Ser. No. 09/696,368.

FIG. 3 shows an exemplary portion 40 of the fault log data stored in the fault log database 22. The fault log data may include a customer identifier in a column 42, a unique locomotive identifier or road number in a column 44, the date that the fault occurred in a column 45, a fault code in a column 46, and a prose description of the fault in a column 50. The time at which the fault occurred is shown in a column 47 and the fault reset time is set forth in a column 48. The values in the columns 47 and 48 are the number of counted intervals from a predetermined start time. These count intervals can be converted to eastern standard time using a well known software decoder and given the start date and time and the count interval. Resetting of a fault can be accomplished automatically or manually. For those faults that do not endanger locomotive operation, after the fault occurs, it will be automatically reset. The recording of this fault serves as a flag indicating the occurrence of an anomalous event (i.e., a fault), but it was only minor or did not prevail for an extended duration. For example, a traction motor current in excess of a threshold value will cause the recording of a fault, but if the current value returns to a normal rating immediately after the spike, the fault will be reset and the locomotive can continue to operate as normal. More serious faults require analysis by human intervention to determine whether the locomotive can continue operation. The occurrence of such faults is recorded and also disables operation of the locomotive subsystem to which it relates. If the locomotive operator or technician determines that continued operation during this fault condition is acceptable, he can manually reset the fault, causing the subsystem to be reactivated. If the nature of the fault is such that operation cannot continue, the locomotive is removed from service. Additional information in the form of operating parametric values when the fault occurred are shown in the fault log 40 within that area designated by a reference character 49. This operational information may include temperature sensor readings, pressure sensor readings, electrical voltage and current readings, and power output readings. Operational states may also be shown within the area designated by the reference character 49. Such operational states include whether the locomotive is in a motoring or a dynamic braking mode, whether any particular subsystem within the locomotive is undergoing a self test, whether the locomotive is stationary, and whether the engine is operating under maximum load conditions.

As taught by the application above entitled "On-Board Monitor for a Railroad Locomotive", the information in the fault log 40 is downloaded a predetermined number of times each day from the locomotive to a remote monitoring and diagnostic center. Certain faults occurring on the locomotive generate an immediate call from the locomotive back to the remote monitoring and diagnostic center, after which the remote monitoring and diagnostic center calls the locomotive for downloading the information shown in the fault log 40. In one embodiment, the remote monitoring and diagnostic center calls the locomotive three times per day to download the fault log data and operational parametric data.

A customer database 25 in FIG. 1 contains additional fault and operational information as recorded by the railroad operating the locomotive. Exemplary information included in each of these data files, which is generally entered by a customer repair technician or the locomotive operator, includes certain faults and anomalous conditions and the time and date of their occurrence. A unique locomotive identifier, for example the locomotive road number, is also included in each data file.

A statistics database 26 includes a plurality of files identifying certain attributes of each locomotive and operational parametric data. For example, a locomotive file in this database includes the version number of significant software applications running on the locomotive, the model number associated with key systems, and other locomotive features (for example, number of engine cylinders and maximum horsepower rating). This file also contains certain cumulative operational statistics such as the cumulative current supplied to the traction motors (in megawatt hours), the current generated by the dynamic braking system (in megawatt hours), the number of engine operational hours, the total number of miles traveled by the locomotive, and the total number of engine hours. Finally, this database includes operational parametric information collected at regular intervals or collected immediately following the occurrence of a fault. The data to be collected and the collection frequency can be either automatically or manually set. Also, in lieu of including the operational parametric data related to a fault in the statistics database, this information can be collected when the fault occurs and made a part of the fault file. In such a case, the operational parametric data would be stored in the fault log database 22, rather than the statistics database 26.

Figure 4:
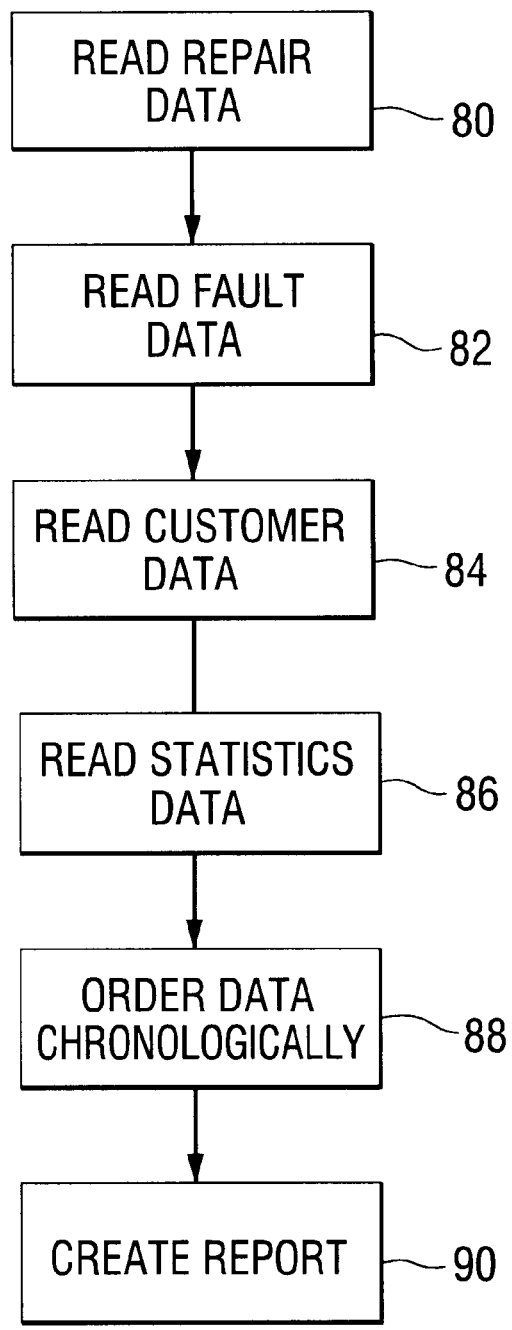
FIG. 4 is a flowchart illustrating operation of the present invention.

FIG. 4 illustrates the process executed by the processor 12 (see FIG. 1) for creating the chronological listing of repairs, faults, and operational data. At a step 80, repair data is read from the repair database 20. At a step 82, the fault data is read from the fault log database 22. At a step 84, information input by the railroad customer into its own database (referred to as the customer database 25 in FIG. 1) is read by the processor 12. Statistics data from the statistics database 26 is read at a step 86. At a step 88, the processor 12 chronologically orders the various input data and creates a report, as indicated at a step 90.

A representative sample of the chronologically ordered report is illustrated in FIG. 5. Organizing the information from the various databases into a time line structure facilitates analysis of locomotive road failures and identification of fault patterns that can be used for early detection and more robust diagnosis of faults. A column 100 identifies the locomotive based on its unit number or road number. The date and time of the occurrence (where the "occurrence" can be a fault, a repair, or simply the reading of operational data) is listed in a column 102. A column 104 identifies a fault by number and a column 106 identifies the fault with a label. A more complete description of the fault is set forth in a column 108. A column 110 identifies the occurrence time using a sequential counter that begins counting at a predetermined time, where the counting start point is under either automatic or manual control. If the fault is reset, that time, again using the counter sequence, is set forth in a column 112. The remaining columns show data related to certain locomotive parameters. The locomotive speed is set forth in a column 114, the direction in a column 116, the notch setting in a column 118, the engine speed in a column 120, the volts across the traction motors in a column 122, and the current input to the traction motors in a column 124. A column 126 lists a sub-identifying number for the fault shown in the column 104.

FIG. 6 is another chronological listing of various fault events in accord with the present invention, including an overlay of a repair performed on Feb. 27, 1999, in Morrill, Nebr. The repair was intended to resolve the fault represented by fault code 7324. Note that in fact 7324 faults do not appear after the repair on February 27, but faults identified by code 731A continue to appear both before and after the repair.

Additional information that can be included in the time line includes: the cab version, the cumulative number of motor megawatt hours and dynamic brake megawatt hours, the total power produced at the time when the fault occurred, the cumulative number of miles logged by the locomotive, the cumulative engine hours, and the latitude and longitude of the locomotive at the time of the occurrence.

CAB is one of many controller cards on the locomotive and includes a processor with executable software. Periodically, improvements and updates are made to this software and bugs in the software code are fixed, but the modified version of the software is not applied to all locomotives simultaneously. Therefore, it is important to know which version of the software is running on a particular locomotive as this information may help in determining the cause for certain faults or in understanding the behavior of out-of-spec operational parameters in the datapack information.

The first fault listed in the time line of FIG. 5 bears number 731A. Turning to the fault description column 108, this fault relates to the phase modulator associated with inverter 3. As is generally known, a diesel engine of a locomotive is drivingly coupled to an alternator for supplying three phase alternating current, which is then rectified to direct current and then inverted back to frequency controllable alternating current for driving traction motors associated with each locomotive axle. Generally, there is one inverter providing controllable alternating current to each traction motor. The first fault listed involves the phase modulator operative on the positive going portion of the B phase alternating current of the third inverter. The fault may also be caused by a problem in the inverter motor controller/ traction motor controller (or IMC 2–3, 4, 7/TMC-3, 0). Certain locomotives include an inverter motor controller while others use a traction motor controller. It should be realized that the potential fault causes listed in the column 108 do not necessarily represent the only conditions leading to fault 731A. Those listed are simply the most likely causes. The fault sub-identification in the column 126 (in this case sub-identification number 4) provides the user with more specific information relative to fault 731A.

Note that within a bubble 130, the fault 731A has occurred twice. Once on Feb. 15, 1999, and again on Feb. 17, 1999. Recognizing that the time line shown in FIG. 5 is merely an excerpt, the analysis of the complete time line may indicate that the fault 731A has occurred on one or more occasions prior to Feb. 15, 1999. The locomotive expert analyzing the time line can identify the first occurrence of fault 731A and the various repairs and operational parameters recorded since that first occurrence. By combining the fault information, repair information, and operational information from separate databases and ordering the information chronologically, the locomotive expert can more easily determine causes and effects as related to the recorded data. The analysis can also identify concurrent faults and perhaps point to a first solution when the faults occur jointly, while a second solution is indicated when only one of the faults occurs. Fault solutions can also be identified dependent upon whether the fault occurs while the locomotive is in the motoring or the dynamic braking mode. Certain faults may occur on one or more of the inverters, indicating a particular solution. But, if all of the inverters manifest a fault, then a different root cause is indicated. By chronologically ordering the data as shown in FIG. 5, the locomotive expert can more easily and efficiently identify related and independent faults so that a more likely successful fault solution can be recommended. Clearly, such a process of careful analysis and identification of joint causes could not be undertaken if the various databases were not combined and chronologically ordered. Further, the root causes identified through the analysis set forth above can be used to create a rule in the expert analysis systems discussed above in the Background section.

One particular fault situation that can be advantageously analyzed using a time line created in accord with the present invention is a so-called "no trouble found" fault. Failure conditions that are difficult to diagnose within a complex system may result in the repair technician's declaration of a no trouble found event because he is unable to either recreate or diagnose the source of the problem. Typically, these no trouble found events occur due to intermittent failures. Or the complexity of the system may obscure the fault condition to a repair technician whose skills are deficient in some area relevant to system performance. No trouble found events are especially troublesome because the locomotive is placed back into service without a resolution of the fault and later may experience a repeat failure due to this same problem. These no trouble found events can also be advantageously analyzed and resolved by the present invention. Recall that certain information in the time line is made available from a customer database. Since the customer is frequently responsible for maintenance and repair of the locomotive, it is the customer repair technician who usually declares a fault to be a no trouble found event. However, when the time line analysis is undertaken by a locomotive repair expert, she may be able to discern the specific nature of the fault and its root cause using the data presented in the time line. As was mentioned above, the relevant time line data that led to the successful resolution of what heretofore had been declared a no trouble found event can be used in the expert systems discussed above to create rules that will be used to successfully identify and solve such faults.

The information contained within a rectangle 140 of FIG. 5 is the customer's record and related description of a locomotive road failure. The noted initial cause of the road failure, based on the customer's recorded comment in the time line, was that one or more traction motors were cut-out, leading to a loss of motive power. The unit was subsequently released as a no trouble found event, because when the technician examined the unit, the traction motors were operating properly. Reviewing the time line of FIG. 5, the locomotive expert can point to the 731A fault as a potential cause of the traction motor cut-out problem. If this was in fact a true no trouble found event (e.g., an intermittent fault), one would not expect to see the reappearance of the 731A fault. In fact, in a bubble 144, the 731A fault continues to log, indicating that the road failure was not a true no trouble found event and that the problem still exists. In fact, it was not until later that the problem causing the 731A fault was finally determined and repaired.

Generally, the invention has been described in conjunction with faults and repair for a single locomotive. Those skilled in the art will recognize that it is advantageous to chronologically combine fault, repair, and statistics information collected from a plurality of locomotives to identify those faults occurring on similar locomotives.

While the invention has been described with reference to a preferred embodiment, it will be understood by those skilled in the art that various changes may be made and equivalent elements may be substituted for elements thereof without departing from the scope of the present invention. In addition, modifications may be made to adapt a particular situation more material to the teachings of the present invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for analyzing faults from a locomotive, said method comprising:
   (a) receiving fault data from a fault database off-board the locomotive, wherein the fault database comprises faults experienced by the locomotive, including information as to when the fault occurred;
   (b) receiving operating parameter data from the locomotive, including information as to when the operating parameter data was collected;
   (c) receiving repair data from a repair database off-board the locomotive, wherein the repair database comprises repairs performed on the locomotive, including information as to when the repair was performed; and
   (d) combining the fault data, the repair data, and the operating parameter data in chronological sequence, to analyze locomotive faults.

2. An article of manufacture comprising a computer program product comprising a computer-usable medium having a computer-readable code therein for analyzing faults from a locomotive using time-tagged data from a plurality of sources, said article of manufacture comprising:
   (a) a computer readable program code module for receiving fault data representing the faults experienced by the locomotive, including information as to when the fault occurred;
   (b) a computer readable program code module for receiving data representing the operational aspects of the locomotive, including information as to when the operational data was collected;
   (c) a computer readable program code module for receiving off-locomotive data selected from the group comprising repair data describing repairs performed on the locomotive including information as to when the repair was performed, maintenance data describing maintenance performed on the locomotive including information as to when the maintenance was performed, and past fault log data describing past faults occurring on the locomotive including information as to when the past fault occurred; and
   (d) a computer-readable program code module for combining the fault data, the operational data and the off-locomotive data in chronological sequence for use in analyzing faults from the locomotive.

3. A method for analyzing faults that occur in railroad locomotive operation using time-tagged data from a plurality of sources, said method comprising:
   monitoring operation of a railroad locomotive for faults and operational conditions of the locomotive;
   transmitting the data indicative of the faults and operational conditions from onboard the locomotive to an off-board location via wireless communications;
   accessing off-board data from the group comprising locomotive repair data, maintenance data and past fault log data for the locomotive stored in one or more historical data bases off-board of the locomotive;
   combining the onboard data and the off-board data in chronological sequence; and
   generating a report including the combined data for use in identifying locomotive operation faults and their causes.

4. The method of claim 3 wherein the step of accessing further comprises accessing off-board data from the group comprising locomotive repair data, maintenance data, past fault log data and operational statistics data for the locomotive stored in one or more historical data bases off-board of the locomotive.

5. The method of claim 3 wherein the off-board location comprises a remote monitoring and diagnostic center.

6. The method of claim 3 wherein the generating step further comprises generating a report including the combined data for use in identifying locomotive repair and maintenance actions.

7. The method of claim 3 wherein the step of monitoring further comprises monitoring operation of a railroad locomotive for faults and for operational conditions of the locomotive occurring at or near the time of the faults.

8. The method of claim wherein the step of generating further comprises generating a report including the combined data for use in identifying potential fault conditions on the locomotive.

9. A method for analyzing the effectiveness of repairs made to a railroad locomotive using time-tagged data from a plurality of sources, said method comprising:

monitoring operation of a railroad locomotive for locomotive operational conditions occurring both before and after the time of a repair to the locomotive;

transmitting the data indicative of the operational conditions from onboard the locomotive to an off-board location via wireless communications, accessing off-board data from the group comprising locomotive repair data, maintenance data and past fault log data for the locomotive stored in one or more historical data bases off-board of the locomotive;

combining the onboard data and off-board data in chronological sequence; and generating a report of the combined data for use in evaluating the effectiveness of the repair.

\* \* \* \* \*